United States Patent
Makiyama

(10) Patent No.: US 6,783,309 B2
(45) Date of Patent: Aug. 31, 2004

(54) AUTOMATIC CUTTING LIQUID SUPPLY APPARATUS

(75) Inventor: Tadashi Makiyama, Onomichi (JP)

(73) Assignee: Horkos Corp., Hiroshima (JP)

( * ) Notice: Subject to any disclaimer, the term of this patent is extended or adjusted under 35 U.S.C. 154(b) by 0 days.

(21) Appl. No.: 10/296,372

(22) PCT Filed: May 14, 2001

(86) PCT No.: PCT/JP01/03999

§ 371 (c)(1),
(2), (4) Date: Nov. 22, 2002

(87) PCT Pub. No.: WO01/89762

PCT Pub. Date: Nov. 29, 2001

(65) Prior Publication Data

US 2003/0133766 A1 Jul. 17, 2003

(30) Foreign Application Priority Data

May 26, 2000 (JP) ........................................ 2000-156092

(51) Int. Cl.$^7$ ............................. B23C 9/00; B23Q 11/10
(52) U.S. Cl. ......................... 409/136; 409/131; 408/56; 408/58; 408/60; 184/6.14; 184/7.4; 184/6.26; 222/52
(58) Field of Search ................................ 409/136, 135, 409/131, 231; 408/56, 58, 60, 61; 184/6.14, 7.4, 6.26; 222/52

(56) References Cited

U.S. PATENT DOCUMENTS

| | | | | |
|---|---|---|---|---|
| 4,578,556 A | * | 3/1986 | Inoue | 219/69.17 |
| 5,187,342 A | * | 2/1993 | Aso et al. | 219/69.14 |
| 5,205,378 A | * | 4/1993 | Boelkins | 184/7.4 |
| 5,676,506 A | * | 10/1997 | Sugata | 409/136 |
| 5,890,948 A | * | 4/1999 | Nilsson | 409/136 |

FOREIGN PATENT DOCUMENTS

| | | | |
|---|---|---|---|
| JP | S3-251340 | | 11/1991 |
| JP | 6-23612 A | * | 2/1994 |
| JP | H6-23651 | | 2/1994 |
| JP | H7-266185 | | 10/1995 |
| JP | H9-066437 | | 3/1997 |
| JP | 2687110 | | 8/1997 |
| JP | H10-76443 | | 3/1998 |
| JP | H10-128642 | | 5/1998 |
| JP | H10-244437 | | 9/1998 |
| JP | 2000-126983 | | 5/2000 |
| JP | 2000-301428 | | 10/2000 |
| JP | 2002-224932 A | * | 8/2002 |

* cited by examiner

*Primary Examiner*—Erica Cadugan
(74) *Attorney, Agent, or Firm*—Koda & Androlia

(57) ABSTRACT

An automatic cutting liquid supply apparatus which automatically supplies a cutting liquid to each tool of a machine tool in accordance with predetermined optimal cutting liquid supply conditions that include variations over time during operation. The optimal supply conditions of the cutting liquid supply quantity (Q) are preset for each type of tool (1) in a control device (5). The control device (5) is constructed from a main control section (5a), which mainly controls the driving of the main shaft units (2) on which the tools (1) are mounted, and an automatic supply control section (5b), which automatically controls the cutting liquid supply quantities (Q). An input signal (Vin) corresponding to the supply conditions (preset) is inputted into the variable frequency generating device (5c) from the automatic supply control section (5b). The variable frequency generating device (5c) generates an output frequency signal (F) that corresponds to the input signal (Vin) and transmits this output frequency signal (F) to the cutting liquid supply device (3). The cutting liquid supply device (3) supplies cutting liquid supply quantities (Q) that are proportional to the output frequency signal (F) to the tools (1) from the cutting liquid tank (3a) by means of the supply pump (3c).

1 Claim, 3 Drawing Sheets

(A) TOOLS USED PREVIOUSLY (B) TOOLS USED FOR THE FIRST TIME

FIG. 3

| TOOL NO. | INITIAL FLOW AMOUNT: $Q_{TI}$ | | CONSTANT FLOW AMOUNT $Q_{TC}$ |
|---|---|---|---|
| | TOOLS USED PREVIOUSLY | TOOLS USED FOR THE FIRST TIME | |
| T 0 1 | 2 0 | 3 0 | 1 0 |
| T 0 2 | 5 0 | 6 0 | 2 0 |
| T 0 3 | 5 0 | 6 0 | 2 0 |
| T 0 4 | 2 0 | 3 0 | 1 0 |
| T 0 5 | 0 | 0 | 0 |
| T 0 6 | 0 | 0 | 0 |
| T 0 7 | 0 | 0 | 0 |
| T 0 8 | 0 | 0 | 0 |
| T 0 9 | 0 | 0 | 0 |
| T 1 0 | 0 | 0 | 0 |

FLOW AMOUNT SETTING SCREEN

FLOW AMOUNT UNITS: ml/hr

AUTOMATIC CUTTING LIQUID SUPPLY APPARATUS

TECHNICAL FIELD

The present invention relates to an automatic cutting liquid supply apparatus in which the amount of cutting liquid that is supplied to each of various types of tools used in a machine tool such as a machining center, etc. is automatically supplied in accordance with predetermined optimal supply conditions that include variations over time during operation.

BACKGROUND ART

Various types of conventional cutting liquid supply apparatuses exist. In, for instance, Japanese Patent No. 2687110, "Main Shaft Device for Machine Tool," an NC type machine tool equipped with a minimum-quantity cutting liquid supply (MQL) system is disclosed. In this prior art, two supply paths that supply a gas and a liquid separately to the inside of the main shaft of a machine tool are provided; and a mist generating device, which mixes the gas and liquid supplied via the supply paths and sprays the mist formed by this mixture, is installed inside the tip end portion of the main shaft or inside the tool holder.

Japanese Patent Application No. H11-112601, "Cutting Liquid Supply Apparatus for Machine Tool" discloses a conventional cutting liquid supply apparatus. This cutting liquid supply apparatus is used in a machine tool in which a cutting liquid is supplied to a mist generating device that is provided in the tip end portion of the main shaft from a cutting liquid supply pump via a cutting liquid supply line. The machine tool is equipped with a cutting liquid absorbing and discharging means which absorbs a fixed amount of cutting liquid inside the cutting liquid supply line when the cutting liquid supply of the cutting liquid supply pump is stopped and supplies a fixed amount of cutting liquid to the cutting liquid supply line when the cutting liquid supply of the cutting liquid supply pump is initiated. Thus, this is an NC type machine tool equipped with a minimum-quantity cutting liquid supply (MQL) system.

Among the conventional cutting liquid supply apparatuses, further, the apparatus in Japanese Patent No. 2687110 and the apparatus of its improvement in Japanese Patent Application No. H11-112601 are respectively provided with a mist generating device and a cutting liquid absorbing and discharging means. These apparatuses are further equipped with a minimum-quantity cutting liquid supply (MQL) system. However, in both apparatuses, cutting liquid at a fixed pressure is merely supplied to the cutting tool over time from the cutting liquid supply means. Accordingly, optimal supply conditions including variations in the amount of cutting liquid supplied over time during the operation of the machine cannot be ensured. For example, the supply conditions that correspond to variations over time during operation, such as the initial operating time (TI) during which the working operation is initiated, and the subsequent constant operating time (TC), etc. depends on whether the tools are those that are used for the first time or those that have a history of previous use. Thus, there is difficulty in the presetting and automatic maintenance of various types of optimal supply conditions (including variations over time during operation) for the cutting liquid supply quantity (Q) that is supplied to each of the tools.

In conventional cutting liquid supply apparatuses, though the minimum-quantity cutting liquid supply (MQL) system is employed, it is still difficult to preset and automatically maintain various types of optimal supply conditions (including variations over time during operation). Accordingly, it is not easy to obtain good cutting characteristics. In addition, a long tool life cannot be ensured, and wasted cutting liquid is expended. It is thus difficult to ensure a so-called completely dry cutting system that is environmentally friendly.

DISCLOSURE OF THE INVENTION

In order to solve the above-described problems, the automatic cutting liquid supply apparatus of the present invention is characterized in that a variable frequency generating means for generating an output frequency signal (F) that corresponds to the input signal (Vin) is used so that a cutting liquid supply quantity (Q) that is proportional to the output frequency signal (F) is supplied to a tool from a supply pump.

BRIEF DESCRIPTION OF THE DRAWINGS

FIG. 2(A) shows the supply conditions of the cutting liquid for a used tool, wherein the set time TI for the initial operating flow amount is 3 sec, and the subsequent time is set as the constant operating flow amount set time TC. FIG. 2(B) shows the supply conditions of the cutting liquid for a tool that is used for the first time, wherein the set time TI for the initial operating flow amount is 5 sec.

FIG. 3 is an explanatory diagram that shows the flow amount setting screen for various types of tools using the apparatus of the present invention.

Figure 1:
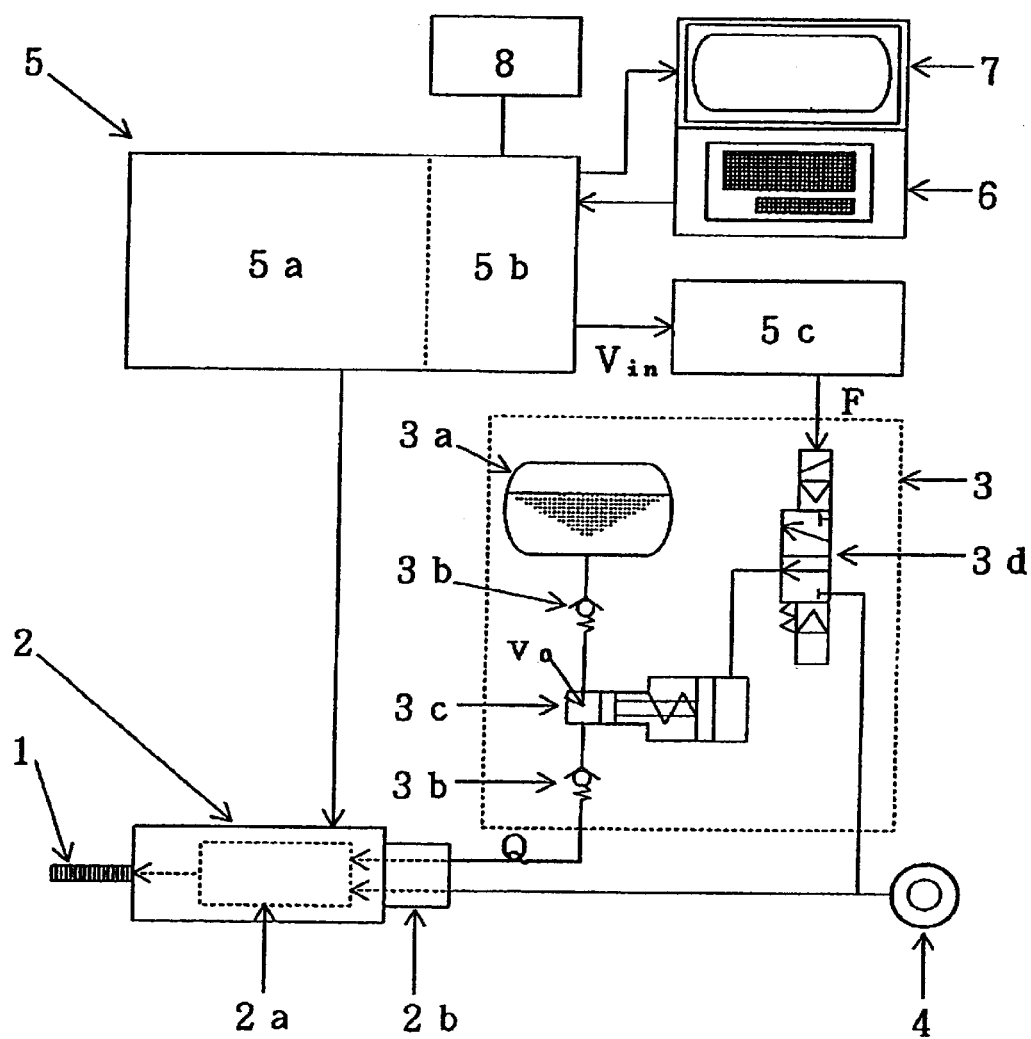
FIG. 1 is a partially cut-away block schematic structural explanatory diagram of an automatic cutting liquid supply apparatus (called "apparatus of the present invention") according to one embodiment of the present invention.

For the convenience, the symbols used in the drawings are described below. These symbols are used as explanatory symbols in the following text that describes the details of the present invention with reference to the accompanying drawings.

| | |
|---|---|
| 1: | Tool |
| 2: | Main shaft unit |
| 2a: | Mist generating means |
| 2b: | Rotary coupling |
| 3: | Cutting liquid supply means |
| 3a: | Cutting liquid tank |
| 3b: | Check valve |
| 3c: | Supply pump |
| 3d: | Compressed air supply valve |
| 4: | Compressed air supply source |
| 5: | Control means |
| 5a: | Main control section |
| 5b: | Automatic supply control section |
| 5c: | Variable frequency generating means |
| 6: | Input means |
| 7: | Display means |
| 8: | Memory means |

-continued

| | |
|---|---|
| vo: | Cutting liquid supply quantity per single operation of the supply pump (3c) |
| Vin: | Input voltage signal to the variable frequency generating means (5c) |
| F: | Output frequency signal from the variable frequency generating means (5c) |
| Q: | Cutting liquid supply quantity supplied from the cutting liquid supply means (3) |
| $Q_{TI}$: | Cutting liquid supply quantity during the initial operating flow amount set time |
| $Q_{TC}$: | Cutting liquid supply quantity during the constant operating flow amount set time |
| TI: | Initial operating flow amount set time |
| TC: | Constant operating flow amount set time |

BEST MODE FOR CARRYING OUT THE INVENTION

The present invention is for an automatic cutting liquid supply apparatus in which various types of optimal supply conditions including variations over time during operation are set beforehand for a cutting liquid supply quantity (Q) supplied to each of various types of tools (1) in a control means (5) of a machine tool that uses various types of tools (1) as a cutting tool, and the cutting liquid supply quantity (Q) that corresponds to a supply condition is automatically supplied during the use and operation of the tool (1); and the control means (5) is comprised of various types of processor-sequencers, etc. and includes a main control section (5a,) which mainly controls driving of a main shaft unit (2) on which a tool (1) is mounted, and an automatic supply control section (5b), which automatically controls the cutting liquid supply quantity; and further the supply condition is inputted and displayed by an input means (6) and a display means (7) which are connected to the control means (5); the supply condition is stored in a memory means (8); an input signal (Vin) that corresponds to the supply condition is inputted into a variable frequency generating means (5c) from the automatic supply control section (5b); the variable frequency generating means (5c) generates an output frequency signal (F) that corresponds to the input signal (Vin) and transmits the output frequency signal (F) to a cutting liquid supply means (3); and the cutting liquid supply means (3) supplies, by means of a supply pump (3c), a cutting liquid supply quantity (Q), which is proportional to the output frequency signal (F), to the tool (1) from a cutting liquid tank (3a) that stores a cutting liquid. In the above structure, the input signal (Vin) can be a voltage, current or other parameter that is appropriately selected in processing steps that include calculations. However, the embodiment below is described with reference to a voltage (value), and thus the terms "input signal" and "input voltage signal" are used interchangeably.

The apparatus of the present invention can be applied to an NC type machine tool, etc. equipped with a minimum-quantity cutting liquid supply (MQL) system. It is thus characterized in the following configurations: Various types of tools (1) are respectively mounted on the tip end portion of a plurality of main shaft units (2). A specified amount of compressed air is introduced from a compressed air supply source (4) and a specified cutting liquid supply quantity (Q) is introduced from the cutting liquid supply means (3); and these introductions are made by the main control section (5a) of the control means (5) via rotary couplings (2b) installed on the rear portions of the main shaft units (2) selected for use in working operations. A mixture is produced by a mist generating means (2a) installed inside each main shaft unit (2), and this mixture is supplied to the tip end portion of each tool (1) through a central axis of the tool (1). This mixture continuously adheres to the tool (1) in the form of minimal liquid droplets without dripping, and the mixture undergoes a rapid expansion from the tip end portion of the tool (1), thus causing heat to be absorbed so that the tool (1) is cooled. Consequently, good cutting characteristics and a long useful life of the tools (1) are ensured, and a so-called dry cutting system in which there is no wasteful expenditure of the cutting liquid is ensured.

In regard to the cutting liquid supply means (3) of the present invention the following configurations can be taken: the output frequency signal (F) from the variable frequency generating means (5c) is inputted into a compressed air supply valve (3d) that consists of an electromagnetic valve; compressed air from the compressed air supply source (4) is sent to the supply pump (3c) for each pulse of the output frequency signal (F); a variable-volume pump that has a cylinder-piston structure is used as the supply pump (3c); the cutting liquid storage volume per operation of the supply pump (3c) is set at vo; the cutting liquid is drawn from the cutting liquid tank (3a) into the cutting liquid storage volume via the check valve (3b); an amount of stored cutting liquid equal to vo is supplied to the tools (1) via the check valve (3b) for each pulse of compressed air from the compressed air supply valve (3d); and the cutting liquid supply quantity (Q) is set as Q=Fvo.

In the apparatus of the present invention, the optimal supply conditions of the cutting liquid do not depend only on the material of the workpiece that is being worked, the types and dimension of the tools used as cutting tools, and the conditions of the working, cutting process, etc. Optimal supply conditions corresponding to variations over time during operation, such as the initial operating time (TI) during which the work is initiated, and the subsequent constant operating time (TC), etc. also depend on whether the tools being used are those that are used for the first time or those that have a history of previous use. It is desirable that various types of optimal supply conditions including variations over time during operation be preset for the cutting liquid supply quantities (Q) that are supplied to each of the tools. For example, in cases where the tools being used are previously used tools, it is desirable that the cutting liquid supply quantity $Q_{TI}$ be set for a specified initial operating time (TI), that the cutting liquid supply quantity $Q_{TC}$ be set for the subsequent constant operating time (TC), and that these values be set so that $Q_{TI} > Q_{TC}$ until the "adaptation" between the workpiece and the cutting surfaces of the tools that are being used reaches a steady state during the initial operating time. In cases where the tools being used are those that are used for the first time, it is desirable that the cutting liquid supply quantity $Q_{TI}$ be set for a specified initial operating time (TI), that a specified cutting liquid supply quantity $Q_{TC}$ be used in the subsequent constant operating time (TC), and that the initial operating time TI be set at a longer time and the corresponding cutting liquid supply quantity $Q_{TI}$ be set at a larger quantity in the case of tools that are used for the first time than in the case of tools that have been previously used. The reason for this is as follows: in the case of tools that are used for the first time, there is no cutting liquid adhering to the internal hole portions of the tools, and thus, it is necessary to supply a correspondingly larger amount of cutting liquid; and also in particular, the generation of heat by friction between the workpiece and the cutting surfaces of the tools being used is greater in the case of tools that are used for the first time than in the case of tools that have been used previously. As seen from the above, the optimal supply conditions described above are employed depending upon the situations.

In the apparatus of the present invention, as a setting display screen for the cutting liquid supply conditions, a flow amount setting screen can be displayed using a display means. The cutting liquid supply quantity $Q_{TI}$ for a fixed initial operating time TI for tools that have previously been used and the cutting liquid supply quantity $Q_{TI}$ for a fixed initial operating time TI for tools that are used for the first time are set for each tool number of the various types of tools. The same cutting liquid supply quantity $Q_{TC}$ are set in the case of the constant operating time (TC) for tools that have been previously used and for tools that are used for the first time. These values are inputted beforehand using an input means such as a keyboard, etc. and stored in a memory means. Each time that a tool is designated and selected by the main control section of the control means, the supply conditions corresponding to this tool is selected; and the above-described specified cutting liquid supply quantity (Q) is supplied to the tool from the automatic supply control section.

(Embodiment 1)

An embodiment of the present invention will be described below. As shown in FIG. 1, the automatic cutting liquid supply apparatus (hereafter referred to as the apparatus of the embodiment) is an automatic cutting liquid supply apparatus in which various types of optimal supply conditions including variations over time during operation are set beforehand for a cutting liquid supply quantity (Q) supplied to each of various types of tools (1) in a control means (5) of a machine tool that uses various types of tools (1) as a cutting tool, and the cutting liquid supply quantity (Q) that corresponds to a supply condition is automatically supplied during the use and operation of the tool (1); and the control means (5) is comprised of various types of processor-sequencers, etc. and includes a main control section (5a), which mainly controls driving of a main shaft unit (2) on which a tool (1) is mounted, and an automatic supply control section (5b), which automatically controls the cutting liquid supply quantity; and further, the supply condition is inputted and displayed by an input means (6) and a display means (7) which are connected to the control means (5); the supply condition is stored in a memory means (8); an input signal (Vin) that corresponds to the supply condition is inputted into a variable frequency generating means (5c) from the automatic supply control section (5b); the variable frequency generating means (5c) generates an output frequency signal (F) that corresponds to the input signal (Vin) and transmits the output frequency signal (F) to a cutting liquid supply means (3); and the cutting liquid supply means (3) supplies, by means of a supply pump (3c), a cutting liquid supply quantity (Q), which is proportional to the output frequency signal (F), to the tool (1) from a cutting liquid tank (3a) that stores a cutting liquid.

When apparatus of the embodiment is applied to an NC type machine tool equipped with a minimum-quantity cutting liquid supply (MQL) system, such an apparatus is, as seen from FIG. 1, characterized as follows: various types of tools (1) are respectively mounted on the tip end portion of a plurality of main shaft units (2); a specified amount of compressed air is introduced from a compressed air supply source (4) and a specified cutting liquid supply quantity (Q) is introduced from the cutting liquid supply means (3), and these introductions are made by the main control section (5a) of the control means (5) via rotary couplings (2b) installed on the rear portions of the main shaft units (2) selected for use in working operations; a mixture is produced by a mist generating means (2a) installed inside each main shaft unit (2), and this mixture is supplied to the tip end portion of each tool (1) through a central axis of the tool (1); this mixture continuously adheres to the tool (1) in the form of minimal liquid droplets without dripping, and the mixture undergoes a rapid expansion from the tip end portion of the tool (1), thus causing heat to be absorbed so that the tool (1) is cooled; consequently, good cutting characteristics and a long useful life of the tools (1) are ensured, and a so-called dry cutting system in which there is no wasteful expenditure of the cutting liquid is ensured.

The apparatus of the embodiment is further characterized in that in regard to the cutting liquid supply means (3): the output frequency signal (F) from the variable frequency generating means (5c) is inputted into a compressed air supply valve (3d) that consists of an electromagnetic valve; compressed air from the compressed air supply source (4) is sent to the supply pump (3c) for each pulse of the output frequency signal (F); a variable-volume pump that has a cylinder-piston structure is used as the supply pump (3c); the cutting liquid storage volume per operation of the supply pump (3c) is set at vo (ml); the cutting liquid is drawn into this cutting liquid storage volume via the check valve (3b) from the cutting liquid tank (3a); an amount of stored cutting liquid equal to vo is supplied to the main shaft units (2) via the check valve (3b) for each pulse of compressed air from the compressed air supply valve (3d); and the cutting liquid supply quantity (Q) is set as Q=Fvo (ml/sec)=3600 Fvo (ml/hr).

Figure 2:
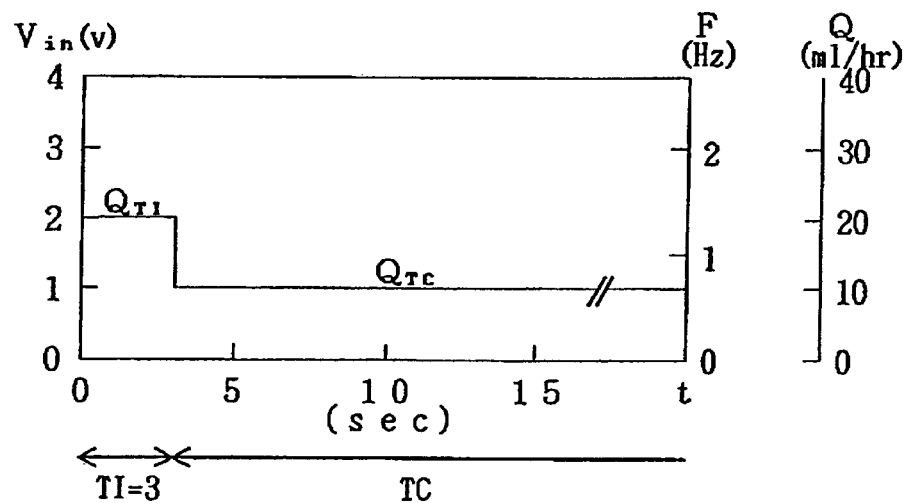
FIG. 2 is a graph that shows the cutting liquid supply conditions in the apparatus of the present invention. Here, the variations over time t in the input voltage signal Vin that controls the variable frequency generating means (5c), the output frequency signal F and the cutting liquid supply quantity Q supplied from the cutting liquid supply means (3) under preset flow amount setting conditions are shown for tool No. T01 used in the apparatus of the present invention.
Figure 2:
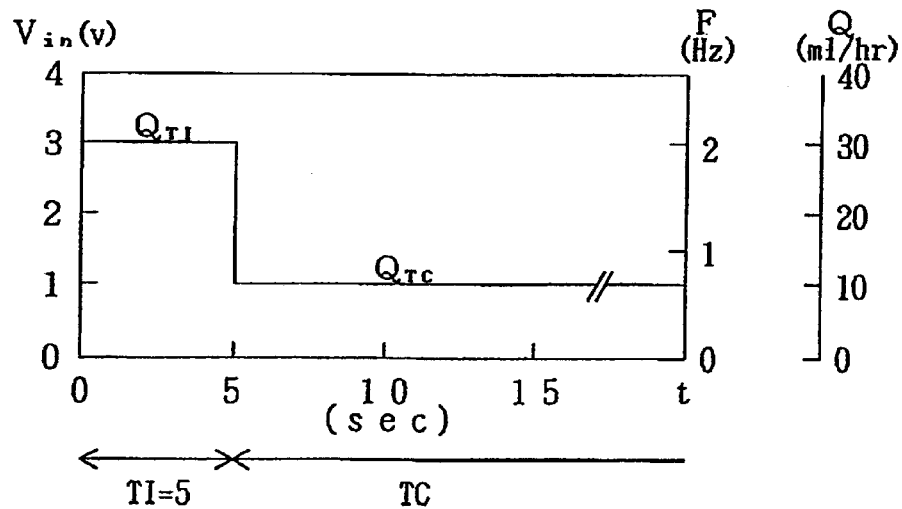

In the apparatus of the embodiment, the optimal supply conditions of the cutting liquid do not depend only on the material of the workpiece that is being worked, the types and dimension of the tools (1) used as cutting tools, and the conditions of the working, cutting process, etc. Optimal supply conditions corresponding to variations over time during operation, such as the initial operating time (TI) during which the work is initiated, and the subsequent constant operating time (TC), etc. also depend on whether the tools being used are those that are used for the first time or those that have a history of previous use. It is desirable that various types of optimal supply conditions including variations over time during operation be preset for the cutting liquid supply quantities (Q) that are supplied to each of the above-described tools. For example, as shown in FIG. 2(A), for a drill diameter of 10 mm in tool No. T01, in cases where this tool is a tool that has previously been used, the cutting liquid supply quantity $Q_{TI}$ is set at 20 (ml/hr) for an initial operating time TI of 3 (sec); and in the case of the subsequent constant operating time (TC), a cutting liquid supply quantity $Q_{TC}$ of 10 (ml/hr) is used. In the initial operating time, it is necessary that $Q_{TI}>Q_{TC}$ until the "adaptation" between the workpiece and the cutting surface of the tool used reaches a steady state. Accordingly, the cutting liquid storage volume vo per operation of the supply pump (3c) is set at 0.0042 (ml), and in order to obtain a Q value of 3600 Fvo (ml/hr), an input voltage signal Vin corresponding to the output frequency signal F (pulses/sec=Hz) from the variable frequency generating means (5c) is output-controlled from the automatic supply control section (5b), so that the input voltage signal Vin constituting the control signal is ensured as shown in FIG. 2(A). On the other hand, as shown in FIG. 2(B), for a drill diameter of 10 mm in tool No. T01, in cases where this tool is a tool that is used for the first time, the cutting liquid supply quantity $Q_{TI}$ is set at 30 (ml/hr) for an initial operating time TI of 5 (sec), and in the case of the subsequent constant operating time (TC), a cutting liquid supply quantity $Q_{TC}$ of 10 (ml/hr) is used. Thus, in the case of a tool that is used for the first time, it is necessary to set the initial operating time TI at a longer time, and also to set the corresponding cutting liquid supply quantity $Q_{TI}$ at a larger quantity, than in the case of a tool that has been previously used as shown in FIG. 2(A). The reason for this is as follows: in the case of tools that are used for the first time, there is no cutting liquid adhering to the internal hole portions of the tools, accordingly, it is necessary to supply a correspondingly larger amount of cutting liquid; and in particular the generation of heat by friction between the workpiece and the cutting surfaces of the tools being used is greater in the case of tools that are used for the first time than in the case of tools that have been used previously.

In the apparatus of the embodiment, as a setting display screen for the cutting liquid supply conditions, a flow amount setting screen such as that shown in FIG. 3 is displayed using a display means (7). For each tool number T-n of the various types of tools, the cutting liquid supply quantity $Q_{TI}$ for a fixed initial operating time TI of 3 (sec) for tools that have previously been used and the cutting liquid supply quantity $Q_{TI}$ for a fixed initial operating time TI of 5 (sec) for tools that are used for the first time are set. The same cutting liquid supply quantity $Q_{TC}$ is set in the case of the constant operating time (TC) for tools that have been previously used and tools that are used for the first time. These values are inputted beforehand using an input means (6) such as a keyboard, etc. and are stored in a memory means (8). Each time that a tool is designated and selected by the main control section (5a) of the control means (5), the optimal supply conditions corresponding to this tool are selected, and the above-described specified cutting liquid supply quantity (Q) is supplied to the tool from the automatic supply control section (5b).

Industrial Applicability

As seen from the above, the automatic cutting liquid supply apparatus of the present invention makes it possible, with the use of a cutting liquid supply means, to perform cutting work under optimal supply conditions that include variations in the cutting liquid supply quantity over time during operation. By way of presetting the supply conditions for each tool, it is possible to handle both cases in which the tools are those that are used for the first time and the tools are those that have a history of previous use, and thus an automatic selection of the tools is possible.

Furthermore, the present invention is applicable to a machining center or NC type machine tool, etc. equipped with a minimum-quantity cutting liquid supply (MQL) system. By way of presetting the optimal supply conditions and ensuring the proper supply quantities, it is possible to prevent the wasteful expenditure of the cutting liquid, and to obtain good cutting characteristics. Furthermore, the useful life of the tools can be extended. Accordingly, a so-called completely dry cutting system that is environmentally friendly can be easily secured.

What is claimed is:

1. An automatic cutting liquid supply apparatus for a machine tool which uses various types of cutting tools (1), in which various types of optimal supply conditions including variations over time for each of said cutting tools during operation of said machine tool are set beforehand as a cutting liquid supply quantity (Q) to be supplied to each of the various types of tools (1) in a control means (5) of the machine tool, and said cutting liquid supply quantity (Q) that corresponds to a supply condition is automatically supplied during the use and operation of one of said tools (1), said automatic cutting liquid supply apparatus being characterized in that:

said control means (5) is comprised of:

a main control section (5a) which controls driving of a main shaft unit (2) on which said one tool (1) is mounted, and an automatic supply control section (5b) which automatically controls said cutting liquid supply quantity (Q); wherein said supply condition is inputted and displayed by an input means (6) and a display means (7), respectively, which are connected to said control means (5);

said supply condition is stored in a memory means (8);

an input signal (Vin) that corresponds to said supply condition is inputted into a variable frequency generating means (5c) from said automatic supply control section (5b);

said variable frequency generating means (5c) generates an output frequency signal (F) that corresponds to said input signal (Vin) and transmits said output frequency signal (F) to a cutting liquid supply means (3); and said cutting liquid supply means (3) supplies, by means of a supply pump (3c), the cutting liquid supply quantity (Q) that was set for said one tool, which quantity is proportional to said output frequency signal (F), to a mist generating means (2a) provided inside said main shaft unit, from a cutting liquid tank (3a) that stores a cutting liquid, thus generating a mist-form mixture with compressed air and supplying the mixture to said one tool (1).

* * * * *